A. L. McGREGOR.
AUTOMOBILE BUMPER.
APPLICATION FILED MAR. 24, 1920. RENEWED DEC. 6, 1920.
1,370,330. Patented Mar. 1, 1921.
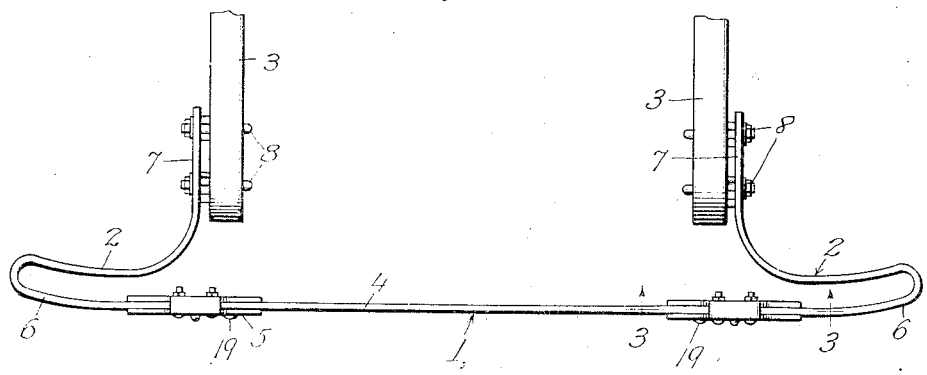
Fig. 1.
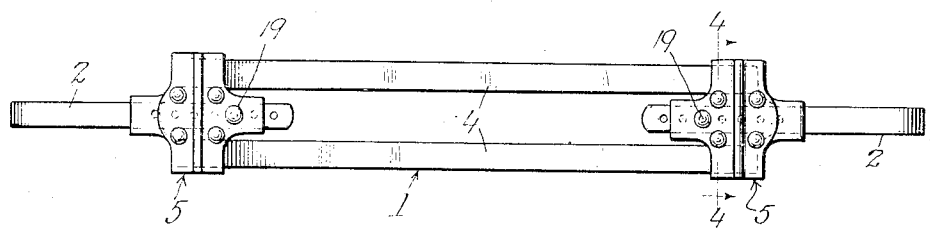
Fig. 2.
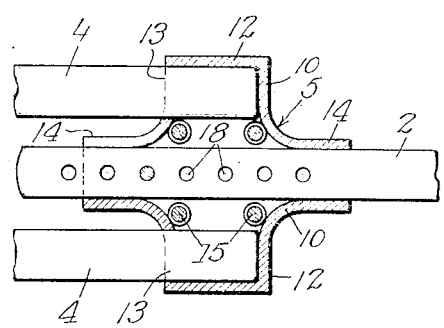
Fig. 3.
Fig. 4.
Inventor
Allan L. McGregor

UNITED STATES PATENT OFFICE.

ALLAN L. McGREGOR, OF CHICAGO, ILLINOIS.

AUTOMOBILE-BUMPER.

1,370,330.     Specification of Letters Patent.     Patented Mar. 1, 1921.

Application filed March 24, 1920, Serial No. 368,462. Renewed December 6, 1920. Serial No. 428,763.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to those devices adapted for attachment to the front or rear end of motor vehicles for the purpose of protecting the vehicle from damage in the event of collision with other vehicles or objects.

The purpose of this invention is to provide a new and novel structure for a device of the character described, embodying in general a bumper structure composed of members having a degree of resiliency calculated to absorb the shock of impact, and further to provide a structure having an increased impact surface throughout its central portion, thereby affording greater degree of protection to the vehicle. A further object is to provide a bumper structure with a certain degree of lateral adjustability between the members thereof, thus enabling the structure to be attached to various makes of vehicles, varying in the distance between the usual points of attachment, the structure embodying the novel features of my invention being hereinafter more fully described and illustrated in the accompanying drawings, in which—

Figure 1 is a top plan view of the bumper attached to the vehicle frame members, Fig. 2 is a front view in elevation of the bumper structure, Fig. 3 is a detailed view in enlarged vertical section of one of the connecting plates taken on line 3, 3 of Fig. 1, and Fig. 4 is an enlarged detail view in cross-section taken on line 4, 4 of Fig. 2.

A preferable construction of a bumper embodying the features of my invention comprises a central impact section 1 and end sections 2, 2 having detachable connection with the frame members 3, 3 of the vehicle and adjustable connection with the central impact section 1. The sections of the bumper are preferably formed of resilient metal of bar form and of such dimension as to be yieldable in horizontal directions and relatively non-yieldable in vertical direction.

The central impact section 1 comprises two parallel and vertically spaced bars 4, 4 of a length substantially equal to the width of the vehicle frame, said bars 4, 4 being connected together at their ends and likewise to the end sections 2, 2 by means of clamping members or junction plates 5, 5, hereinafter to be described more in detail.

The end sections 2, 2 of the bumper consist of single bars, each being bent or formed to provide the U-shaped extremities 6, 6 of the bumper, the forward end portions of the bars 2, 2 extending inwardly toward and in horizontal alinement with each other and terminating a short distance beyond the prolongation of the vehicle frame members 3, 3. The rear portion of the bars 2, 2 beyond the U-shaped extremities 6, 6 thereof are bent substantially at right angles to the front portions thereof to provide attaching portions 7, 7 extending parallel to the frame members 3, 3 and adapted to be detachably connected thereto by means of suitable clamping bolts 8, 8.

Referring more in detail to the structure of the central impact section 1 and the junction plates 5, 5, each of the latter comprises a metal plate 9 having the shape of a Geneva cross, the margins of said plates being provided with transverse flanges 10 and integral inturned flanges 11 extending parallel to the plate 9 and forming therewith channels for receiving the adjacent ends of the bars 4, 4 and one of the end sections 2. The oppositely disposed and vertically arranged arms 12, 12 are adapted to receive the ends of the bars 4, portions of the transverse flange 10 being removed along the inwardly facing vertical edges to provide entrance slots 13, 13 through which the ends of said bars 4, 4 are inserted. The horizontal and oppositely disposed arms 14, 14 are open at their ends and form a horizontal channel to receive the ends of the end sections 2, 2 which extend through the channels from the outer ends thereof and terminate a short distance beyond the inner ends of the channel, as shown in Fig. 3, a plurality of bolts 15 preferably arranged in pairs on opposite sides of the bar 2 and between said bar and the bars 4, 4 of the central impact section 1, said bolts having the nuts 16 and washers 17 mounted on their threaded ends, said nuts being capable of being tightened to clamp the several bars securely in place between the vertical plate 9 of the clamping members 5, 5 and the washers 17 which overlap the adjacent marginal portions of the bars.

The function of the clamping plates is therefore to connect the ends of the bars 4, 4, thereby providing a rigid frame forming the central impact section 1 and further to connect the central impact section 1 to the ends of the end sections 2, 2. In order to permit the lateral expansion or adjustment of the bumper structure, thereby permitting the varying of the distance between the attaching portions 7, 7 to accommodate the varying width between the frame members 3, 3, I prefer to provide a certain degree of lateral adjustment between the clamping plates 5, 5 and the portions of the end sections 2, 2 with which they are connected. This is accomplished by providing a series of holes 18 arranged longitudinally along the end portion of each bar 2, said holes being adapted to register with a bolt hole extending through the clamping member 5, there being inserted through the registering holes a bolt 19. It is manifest that by removing the bolt 19 and loosening somewhat the nuts 16 on the bolts 15, the bars 2, 2 may be adjusted or moved endwise relative to the clamping members 5, 5 and having determined the proper width separating the attaching portions 7, 7 of the bars 2, 2, the bolts 19, 19 may be inserted in the proper hole 18 and the several bolts tightened to secure the structure rigidly together.

By reason of the construction herein described several advantageous results are accomplished, among which may be mentioned, first, the utilization of the two vertically spaced bars forming the impact section and connecting these bars at their ends by means of the clamping members, thereby providing a rigid frame, and secondly, connecting the central impact section 1 to the end sections 2, 2 by means of the clamping plates. By providing clamping plates having the structure described, ample bearing surfaces are obtained, thereby affording ample strength at these points. The advantage of the adjustable feature is manifest and is secured in a simple yet desirable manner which in no wise decreases the strength of the bumper.

Although I have illustrated and described the preferred embodiment of my invention, it is to be understood that I do not wish to be limited except in so far as the invention is more specifically described in the appended claims.

I claim as my invention:

1. In an automobile bumper, the combination of end sections adapted for attachment to the automobile frame, and terminating in laterally spaced free end portions, and an intermediate impact section, comprising vertically spaced parallel bars, rigidly connected at their ends and adjustably connected to the free ends of said end sections.

2. In an automobile bumper, the combination of end sections adapted for attachment to the frame of an automobile, the free ends thereof terminating in laterally spaced relation, and an intermediate impact section, comprising parallel bars, means connecting the ends of said bars to form a rigid frame, and having adjustable connection with the free ends of said end sections.

3. In an automobile bumper, the combination of end sections of U-shape adapted for attachment to the frame of an automobile, the free ends thereof terminating in laterally spaced relation, and an intermediate impact section, comprising parallel bars, plates rigidly connecting the ends of said bars, and adapted for laterally adjustable connection with the free ends of said end sections.

4. In an automobile bumper, the combination of end sections adapted to be connected at one of their ends to the frame of an automobile, and terminating at their free ends in laterally spaced relation, and an intermediate impact section comprising vertically spaced bars, and clamping members rigidly connecting the free ends of said bars, and provided with channels adapted to receive the ends of said end sections, and means for adjustably connecting said clamping members and said end sections.

5. In an automobile bumper, the combination of end sections of U-form adapted to be connected at one of the ends to the frame of an automobile, and terminating at their free ends in laterally spaced and horizontally alined relation, and an intermediate impact section comprising vertically spaced bars, clamping plates rigidly connecting the ends of said bars, and each provided with a channel adapted to receive the free end of one of said end sections, each of said end sections being provided with series of holes adapted to register with a hole in its associated plate and to receive a bolt in several positions of lateral adjustment.

In witness whereof, I hereunto subscribe my name this 20th day of March, A. D., 1920.

ALLAN L. McGREGOR.